(12) United States Patent
Lykke

(10) Patent No.: US 9,045,342 B2
(45) Date of Patent: Jun. 2, 2015

(54) SULPHURIC ACID PRODUCTION WITH RECYCLE OF DESULPHURIZED GAS

(71) Applicant: Haldor Topsøe A/S, Kgs. Lyngby (DK)

(72) Inventor: Mads Lykke, Brønshøj (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 14/343,092

(22) PCT Filed: Sep. 27, 2012

(86) PCT No.: PCT/EP2012/069099
§ 371 (c)(1),
(2) Date: Mar. 6, 2014

(87) PCT Pub. No.: WO2013/045558
PCT Pub. Date: Apr. 4, 2013

(65) Prior Publication Data
US 2014/0219910 A1    Aug. 7, 2014

(30) Foreign Application Priority Data
Sep. 29, 2011   (WO) .................. PCT/EP2011/004860

(51) Int. Cl.
| | | |
|---|---|---|
| *C01B 17/76* | (2006.01) | |
| *C01B 17/80* | (2006.01) | |
| *C01B 17/765* | (2006.01) | |
| *B01D 53/86* | (2006.01) | |
| *B01D 53/50* | (2006.01) | |

(52) U.S. Cl.
CPC .............. *C01B 17/765* (2013.01); *B01D 53/501* (2013.01); *B01D 53/8609* (2013.01); *C01B 17/7655* (2013.01); *C01B 17/80* (2013.01); *B01D 2255/202* (2013.01); *B01D 2255/20723* (2013.01); *B01D 2258/0283* (2013.01)

(58) Field of Classification Search
CPC ................................ C01B 17/76; C01B 17/80
USPC ........... 423/522, 529, 533; 422/129, 160, 161
See application file for complete search history.

(56) References Cited

U.S. PATENT DOCUMENTS 4,490,347 A * 12/1984 Gelblum ....................... 423/521

FOREIGN PATENT DOCUMENTS

| | | |
|---|---|---|
| DE | 35 34 060 A1 | 4/1987 |
| EP | 0 972 746 A1 | 1/2000 |
| EP | 2 163 515 A2 | 3/2010 |
| EP | 2 330 075 A1 | 6/2011 |

* cited by examiner

*Primary Examiner* — Timothy Vanoy
(74) *Attorney, Agent, or Firm* — Dickstein Shapiro LLP

(57) ABSTRACT

The invention relates to a process for oxidation of $SO_2$ to $SO_3$ comprising the steps of (a) directing a stream of feed gas comprising $SO_2$ and $O_2$ to a catalytically active material, (b) oxidizing an amount of said $SO_2$ in said process gas to $SO_3$ in the presence of the catalytically active material, providing a first oxidized process gas, (c) reacting $SO_3$ with water, (d) condensing $H_2SO_4$, (e) withdrawing a first desulphurized process gas and a first stream of sulphuric acid, (f) from the desulphurized process gas withdrawing a recycle stream of desulphurized process gas, wherein the recycle stream is added to said stream of feed gas or said first oxidized process gas with the associated benefit of reducing the molar flow of process gas downstream withdrawal of the recycle stream and upstream the mixing point.

14 Claims, 4 Drawing Sheets

SULPHURIC ACID PRODUCTION WITH RECYCLE OF DESULPHURIZED GAS

Figure 1:
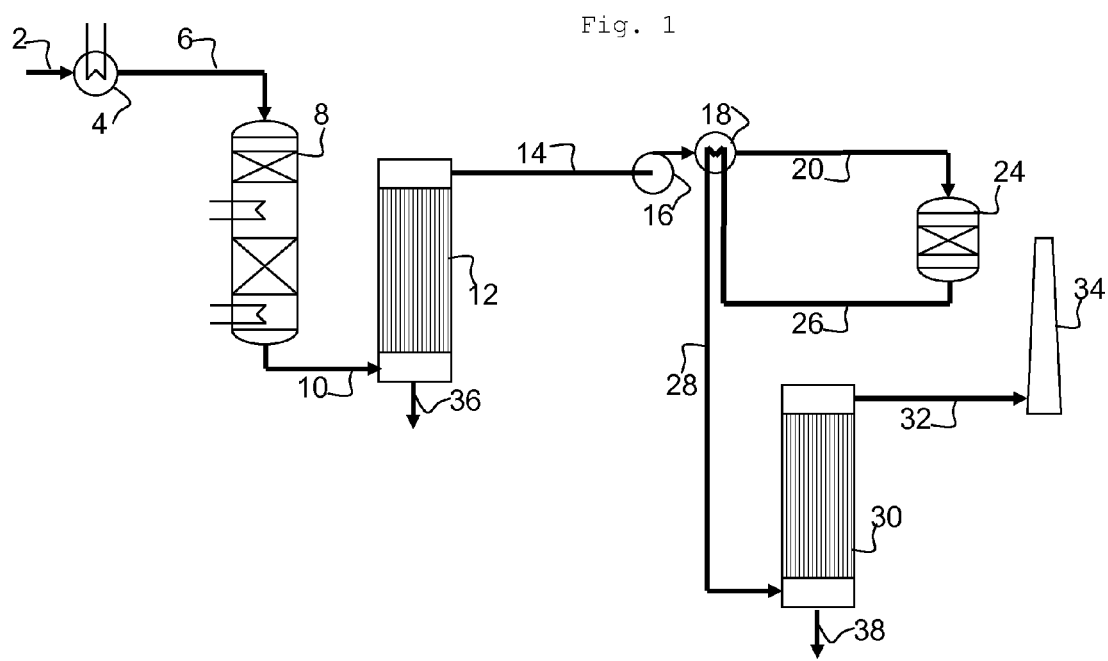

The present invention relates to a method for production of sulphuric acid by desulphurisation of an $SO_2$ rich process gas, including feed gases from combustion of a sulphur source such as $H_2S$, sulphur and spent acid, and flue gases from combustion plants. More specifically it relates to a process with reduced equipment requirements involving recycle of the desulphurised process gas.

Sulphuric acid can be produced from gases containing sulphur oxides. One such process is based on the oxidation of $SO_2$ to $SO_3$ in the presence of water vapour, followed by condensation to $H_2SO_4$, and is sold under the trade name WSA (the Wet gas Sulphuric Acid) by the company Haldor Topsøe A/S of Denmark. The source of sulphur may either be an off-gas with high sulphur content, or more typically, a gas produced by combustion of a sulphur rich source, such as elemental sulphur or hydrogen sulfide.

With increasing environmental concern, the regulations of sulphur oxide emissions to very low concentrations has led to the development of two WSA process plants configured in series as disclosed in WO 2008/064698, hence the trade name WSA-DC for dual condensation.

The WSA process operates with water concentrations in the process gas close to or above stoichiometric concentrations with respect to $SO_3$ hydration. Therefore, the ability to control condensation of sulphuric acid is critical, as sulphuric acid is very corrosive. Condensation of sulphuric acid occurs if the gas temperature is below the sulphuric acid dew point, which is a function of partial pressures of sulphuric acid and water. The conditions in the WSA process downstream catalytic oxidation are typically chosen for obtaining a given dew point of $H_2SO_4$, such that condensation of $H_2SO_4$ only occurs inside the condensation unit. With $SO_3$ concentrations in the oxidized process gas above about 5% by volume this typically requires dilution of the oxidized process gas, which is provided by adding excess air, compared to the stoichiometric requirements for oxidation of sulphur compounds to sulphur trioxide. This excess air will lead to an excess flow of process gas and therefore to extra cost and reduced heat recovery.

The material cost and operational cost of the desulphurisation process is increased with increased total molar flow in the plant. Therefore, it is desirable to identify ways of reducing this flow. Furthermore, the amount of heat recovered in the desulphurisation plant is also an important economical factor for the plant.

For catalytic oxidation of $SO_2$ it is required that the temperature of the process gas is at least 370° C. at the inlet to the $SO_2$ converter. This can be obtained e.g. by tempering the process gas upstream the catalytic reactor in which the $SO_2$ is oxidized to $SO_3$. The exothermal reaction typically requires temperatures above 370 to 390° C. for activation, but temperatures above this pushes on the other hand the equilibrium between $SO_2$ and $SO_3$ towards $SO_2$ such that less sulphuric acid is formed.

Downstream the catalytic reactor the $SO_3$-rich gas is cooled to 230-310° C. and the $SO_3$ is hydrated to $H_2SO_4$ vapour in or upstream a condenser in which the $H_2SO_4$ vapour and most of the $SO_3$ is selectively condensed as concentrated sulphuric acid.

WO 2008/064698 relates to a process for producing sulphuric acid from feed gases implemented as a dual desulphurisation process, which employs two WSA process plants in series, with the associated benefit of being able to operate each combined process optimally at high and low $SO_2$ levels, respectively.

EP 0 972 746 and EP 2 330 075 relates to processes for production of sulfuric acid, by the so called dry contact process, in which a dried waste gas is recycled to the sulphur burner. According to the dry contact process, $SO_2$ is oxidized to $SO_3$ in a dry environment followed by absorption of $SO_3$ by contacting the gas with a water/sulphuric acid absorbent, with the associated benefit of fewer demands to the robustness of catalyst and with flexibility for the heat exchanger designs due to the absence of condensable sulphuric acid, but at the expense of requiring equipment for drying the feed gas prior to oxidation. A sulphur depleted gas is recycled for being fed upstream a sulphur combustion unit, in order to control the combustion temperature, increase sulphur removal and reduce equipment size. Neither of these two disclosures realize the important relations between dilution by recycled gas and the dew point of a gas comprising water, sulphur trioxide and sulphuric acid.

The present disclosure is aimed at reducing the investment and operational cost of a dual desulphurisation plant by reducing the molar flow of process gas in selected sections of the WSA plant. This is done by configuring the desulphurisation plant for recycle of a substream of a first desulphurised process gas, such that the first desulphurisation process operates with sufficient dilution for avoiding sulphuric acid condensation outside the condenser, while the remainder of the desulphurisation process in which less or no dilution is required due to the lower concentrations of $SO_3$ may be reduced in size due to the absence of the recycled gas in the flow. Similarly the size of the sulphur combustor and other equipment upstream the addition of recycled desulphurized gas may be reduced. This also reduces the amount of energy required for heating the feed gas to the second catalytic reactor.

Sections of the present application relates to a process having two desulphurisation steps. In this respect, the terms upstream or first desulphurisation process or desulphurisation unit shall be understood as related to one desulphurisation steps being most proximate to the feed gas, and downstream, second or secondary to the other desulphurisation step being most proximate to the stack.

Throughout the present text, trivial but critical elements such as pumps, valves and heat exchangers may not be mentioned explicitly, but such an omission shall not be construed as an absence of the elements, unless explicitly mentioned as such.

In a first embodiment the invention relates to a process for oxidation of $SO_2$ to $SO_3$ comprising the steps of, (a) directing a stream of feed gas comprising $SO_2$ and $O_2$ to a catalytically active material, (b) oxidizing an amount of said $SO_2$ in said process gas to $SO_3$ in the presence of at least 0.1% water and the catalytically active material, providing a first oxidized process gas (c) reacting $SO_3$ with water, (d) condensing $H_2SO_4$ (e) withdrawing a first desulphurized process gas and a first stream of sulphuric acid (f) from the desulphurized process gas withdrawing a recycle stream of desulphurized process gas, wherein the recycle stream is added to said stream of feed gas or said first oxidized process gas with the associated benefit of reducing the molar flow of process gas downstream withdrawal of the recycle stream, and upstream the mixing point, with the associated benefit of removing $SO_2$ from a flue gas as sulphuric acid, without having to dry the process gas and subsequently add water to the gas, while maintaining non-corrosive conditions in all of the process plant.

In a further embodiment the process further comprises the secondary sulphur removal process steps of
(g) reheating the first desulphurized process gas,
(h) oxidizing an amount of the remaining $SO_2$ in said first desulphurized process gas to $SO_3$ in the presence of a second catalytically active material providing a second oxidized process gas
(i) reacting $SO_3$ with water,
(j) condensing $H_2SO_4$
(k) and withdrawing a second desulphurized process gas and a second stream of sulphuric acid with the associated benefit of further reducing the concentration of $SO_2$ in the process gas.

In a further embodiment the process further comprises the process step of (l) heating the recycle stream of desulphurized process gas to a temperature above the dew point of sulphuric acid in the desulphurized flue gas with the associated benefit of reducing the risk of condensation of corrosive sulphuric acid, after mixing with the process gas.

In a further embodiment the temperature of the recycle stream is at least 10° C., preferably at least 30° C. and even more preferable at least 50° C. above the dew point with respect to sulphuric acid with the associated benefit of reducing the risk of corrosion by ensuring ample margin to the dew point of sulphuric acid.

A further embodiment involves one or more secondary sulphur removal process steps taken from the group consisting of
(m) removal of sulphuric acid mist by collection of droplets in a mist filter and withdrawal of collected sulphuric acid droplets,
(n) removal of sulphuric acid mist by electrostatic precipitation, and removal of precipitated sulphuric acid
(o) removal of sulphur oxides by absorption in a scrubber, wherein said scrubber contains an alkaline solution and/or an oxidative solution with the associated benefit of providing the optimal means for reduction of $SO_x$ concentrations in the clean gas according to specific process requirements.

In a further embodiment the recycle stream is withdrawn downstream the secondary sulphur removal process step with the associated benefit of a reduced molar flow upstream the desulphurisation process, while high dilution is maintained in all of the desulphurisation plant.

In a further embodiment the recycle stream is withdrawn downstream the secondary sulphur removal process step with the associated benefit of a reduced molar flow upstream the desulphurisation process and in the secondary sulphur removal process.

In a further embodiment the concentration of $SO_2$ in the $SO_2$ rich gas is in the range 5-100% vol, preferably 5-30% vol, allowing maximum benefit from removal of sulphur oxides in two independent processes in series.

In a further embodiment at least 99% of the sulfur comprised in the feed gas is in oxidised form such as $SO_2$ or $SO_3$ or the corresponding acids, with the associated benefit of the substantially all of the sulphur being condensable as acid in the process.

In a further embodiment less than 50% of said desulphurized process gas is withdrawn as a recycle stream of desulphurized process gas, with the associated benefit of avoiding a built up of inert gases, such as nitrogen and argon.

In a further embodiment the volumetric concentration of oxygen in said process gas being directed to contact the catalytically active material is at least the same as the volumetric concentration of sulphur dioxide, with the associated benefit of providing an efficient oxidation process with fast reaction due to the excess of oxygen.

In a further embodiment the temperature of said recycled gas is above 200° C., with the associated benefit of the recycled gas being maintained non-corrosive, even in the presence of water and sulphur oxides.

A further aspect of the invention, relates to a process plant for desulphurisation of a feed gas comprising a first bed of catalytically active material, a first condensation unit and a downstream desulphurisation plant configured for recycling of a stream being withdrawn downstream said first condensation unit and optionally downstream the downstream desulphurisation unit and being recycled to a process position upstream the first condensation unit, and optionally upstream said first bed of catalytically active material, with the associated benefit of reducing the molar flow of process gas downstream withdrawal of the recycle stream, with the associated benefit of providing a plant for removing $SO_2$ from a flue gas as sulphuric acid, without having to dry the process gas, while maintaining non-corrosive conditions in all of the process plant.

A further embodiment involves one or more additional sulphur removal process units downstream the desulphurisation plant taken from the group consisting of (i) a process unit comprising a catalytic material for oxidation of $SO_2$ to $SO_3$ and a condenser for condensation of sulphuric acid, (ii) a mist filter for removal of sulphuric acid mist by collection of droplets and withdrawal of collected sulphuric acid droplets, (iii) an electrostatic precipitator for collection of liquid sulphuric acid from sulphuric acid mist, and (iv) a scrubber for removal of sulphur oxides by absorption in an alkaline solution and/or an oxidative solution with the associated benefit of providing the optimal means for reduction of $SO_x$ concentrations in the clean gas according to specific process requirements.

A further embodiment is configured for recycling of a stream being withdrawn downstream said first condensation unit and upstream the downstream desulphurisation unit with the associated benefit of reducing the molar flow inside the downstream desulphurisation unit.

A further embodiment involves a combustion unit for a sulphur rich material upstream said process plant in which the stream being recycled is directed to a position upstream or downstream said combustion unit, with the associated benefit of independently providing a sulphur source for the production of sulphuric acid.

Figure 2:
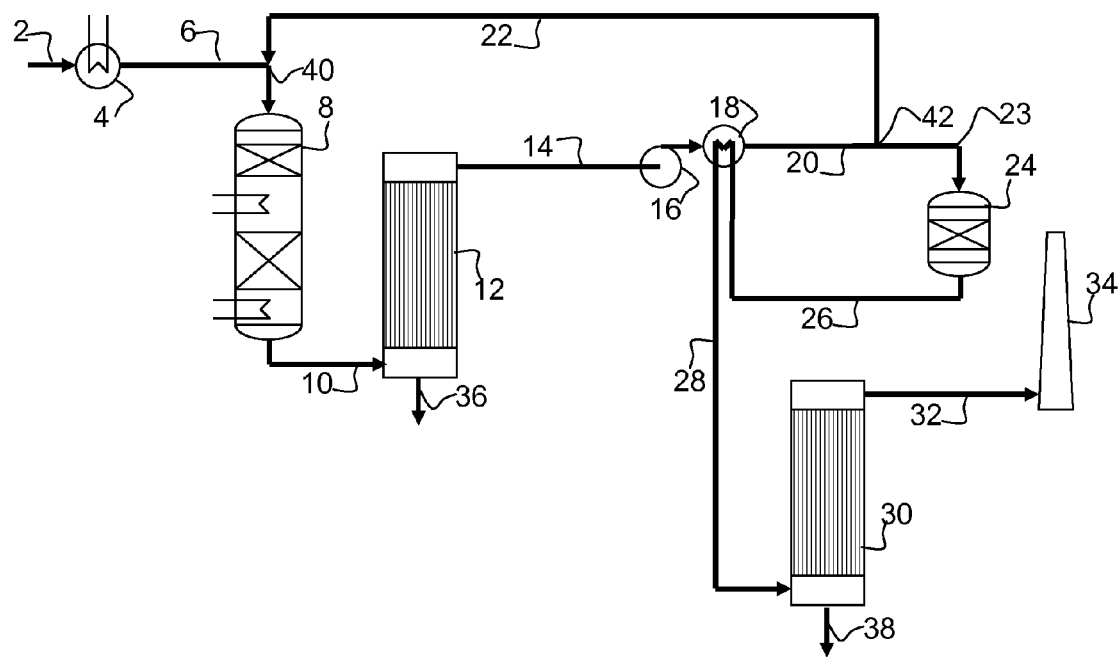
Figure 3:
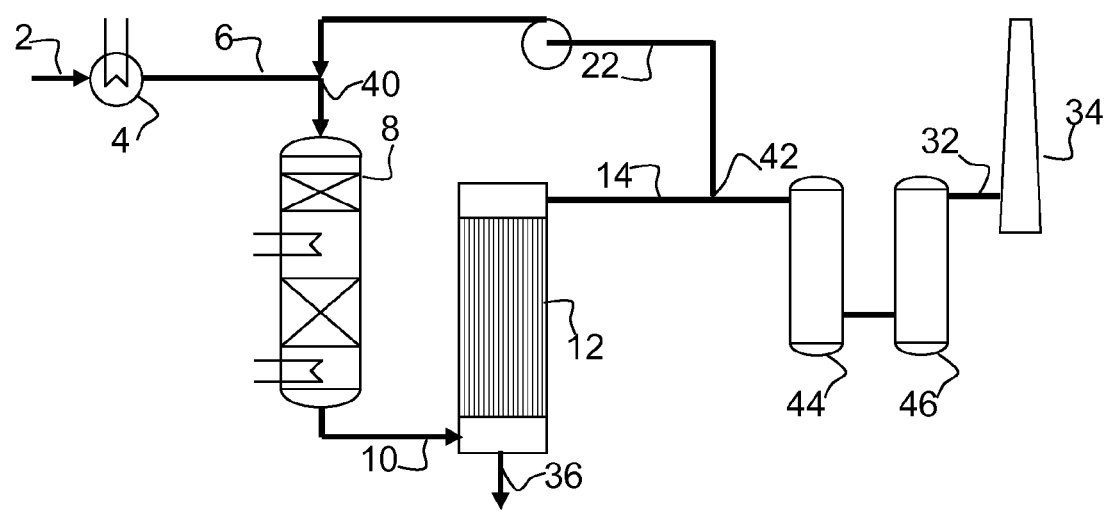
Figure 4:
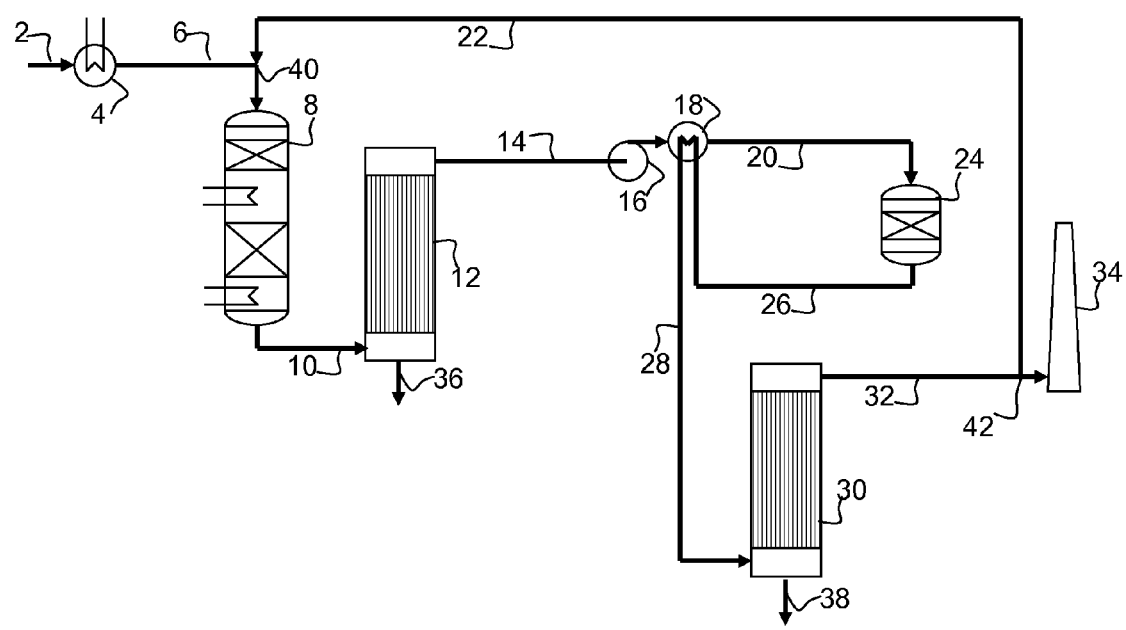

FIG. 1 illustrates a process according to the prior art.
FIG. 2 illustrates a process according to an embodiment of the present disclosure involving two WSA processes in series.
FIG. 3 illustrates a process according to an embodiment of the present disclosure involving a WSA process and a scrubber process in series.
FIG. 4 illustrates a process according to an embodiment of the present disclosure in which the recycled stream is withdrawn downstream both desulphurisation processes.

A process as shown in FIG. 1, for removal of $SO_2$ from process gases, with associated production of sulphuric acid is known from the prior art, and may be described as a Double Conversion/Double Condensation process. In the process a feed gas 2 containing $SO_2$ may optionally, by cooling or heating in an appropriate heat exchanger 4, be provided as a process gas 6 at a temperature sufficient for catalytic oxidation of $SO_2$ to $SO_3$ to be initiated such as around 370-420° C. The tempered process gas 6 is directed to a catalytic reactor 8 in which oxidation of $SO_2$ to $SO_3$ takes place in the presence of an appropriate sulphuric acid catalyst. A range of such sulphuric acid catalysts are known to the person skilled in the art. One possible catalyst is vanadium oxide supported on a silica carrier material and promoted with alkali metals. Preferred alkali metals are potassium, sodium, and/or caesium.

To avoid pushing the $SO_2/SO_3$ equilibrium towards $SO_2$ while enjoying the benefit from high reaction rates at high temperatures, the oxidation is often carried out in two or three beds with intermediate heat exchangers, and followed by a further heat exchanger.

At the outlet from the catalytic reactor a first oxidized process gas 10 is available. This first oxidized process gas contains water vapour which as temperature is reduced hydrates $SO_3$ to form gaseous $H_2SO_4$, sulphuric acid. The oxidized and partly hydrated process gas is directed to a condensation unit 12, in which the temperature is reduced to below the dew point of sulphuric acid. The sulphuric acid condenses and may be collected in concentrated form at the bottom of the condensation unit 36. At the top outlet of the condensation unit a desulphurised process gas 14 is directed downstream to a further catalytic reactor 24 where most of the remaining $SO_2$ is oxidized, forming a second oxidized process gas 26, which undergoes a similar condensation process in 30, before it is directed to the stack 34 as a clean gas 32.

Now according to the present disclosure with reference to FIG. 2 and FIG. 3, it is desired to keep the oxidised process gas 10 above the sulphuric acid dew point, while ensuring a high level of sulphur removal and reducing the size of equipment. This is obtained by keeping the concentration of sulphur oxides low, by dilution of the feed gas 6 with a first recycle stream 22 of desulphurised process gas in a mixing point 40. The molar flow of the recycle stream 22 is about the same as the amount of excess air according to the prior art, and therefore overall conditions, including the concentration of $SO_3$ and $H_2SO_4$ in the first oxidized process gas 10 of this embodiment, are equivalent to those of the prior art. The reduced molar flow of desulphurised process gas 23, downstream the withdrawal point 42 now constitutes a secondary process gas, which may be desulphurised further in a downstream desulphurisation process.

In a preferred embodiment illustrated in FIG. 2, the downstream desulphurisation process is a second WSA process configured for removal of a low level of sulphur oxides comprising a catalytic reactor 24 and a condenser 30. This downstream desulphurisation process may be significantly smaller than the upstream desulphurisation process, since the molar flow is much lower due to the withdrawal of the recycle stream 22.

In an alternative embodiment illustrated in FIG. 3, the first WSA Process is followed by an alternative process for removal of low concentrations of sulphur oxides, such as a scrubber 44,46 for collection of sulphur oxides in either sodium hydroxide or hydrogen peroxide.

In a further embodiment illustrated in FIG. 4, the withdrawal point may be positioned downstream the downstream desulphurisation process. In this case a large molar flow will be present in both desulphuration processes, but a reduced molar flow will be present upstream the first desulphurisation. This embodiment may be especially suited for sulphuric acid production by combustion of a sulphur source, as the sulphur combustor can be reduced in size, compared to the prior art.

The addition of the recycle stream in the mixing point 40 may require careful mixing to avoid pockets of condensing conditions, where corrosion may take place. This may beneficially be implemented by an appropriate gas mixer such as disclosed in WO2011/101038.

In a further embodiment the process may also include a combustor receiving a sulphur rich feed, comprising e.g. hydrogen sulphide, spent acid, or sulphur, and the recycle stream may be added to the feed gas upstream this combustor. Such addition upstream a sulphur combustor shall be considered equivalent to the addition of a recycle stream downstream said sulphur combustor.

EXAMPLES

In order to evaluate embodiments of the prior art and embodiments of the present disclosure, performance and design parameters has been evaluated for 3 sulphuric acid processes designed for production of 600 metric ton sulphuric acid per day (calculated as 100% $H_2SO_4$). The processes produce 98% (w/w) $H_2SO_4$, with a $SO_2$ conversion of 99.83%. Outside the desulphurisation plant steam may be converted into electrical power. For the process the feed is 100% $H_2S$ gas and the ambient conditions are pressure 1001 mbar abs at 25° C., 65% RH.

Example 1

The process unit is designed according to FIG. 1, i.e. Double Conversion/Double Condensation. The following process steps apply with reference to elements of FIG. 1:

| Combustion | (not shown) |
|---|---|
| Cooling | (4) |
| 1$^{st}$ Conversion and Cooling | (8) |
| 1$^{st}$ Condensation and acid withdrawal | (12, 36) |
| Reheating | (18) |
| 2$^{nd}$ Conversion and Cooling | (24, 18) |
| 2$^{nd}$ Condensation and acid withdrawal | (30, 38) |
| Clean Gas to stack | (34) |

From the data in Table 1, it can be seen that the unit is performing according to the performance requirements with a clean gas flow of 73500 $Nm^3/h$.

Example 2

The process unit is designed as a Double Conversion Double Condensation unit according to an embodiment of the present disclosure, i.e. desulphurised process gas is recycled downstream reheating 18 to upstream the $SO_2$ converter 8 according to FIG. 2.

| Combustion | (not shown) |
|---|---|
| Cooling | (4) |
| Mixing process gas with recycle gas | (6, 22, 40) |
| 1$^{st}$ Conversion and Cooling | (8) |
| 1$^{st}$ Condensation and acid withdrawal | (12, 36) |
| Reheating | (18) |
| Withdrawal of recycle gas | (22, 42) |
| 2$^{nd}$ Conversion and Cooling | (24, 18) |
| 2$^{nd}$ Condensation and acid withdrawal | (30, 38) |
| Clean Gas to stack | (34) |

From Table 1 it is evident that the sulphur emission is as low as for the prior art process of Example 1. In addition, the process gas molar flow before the recycle gas mixing point 40 and after the recycle gas withdrawal point 42 have been reduced by more than 20% to a clean gas flow of 56500 $Nm^3/h$ resulting in a smaller and more cost efficient layout.

Example 3

The process unit is designed according to FIG. 3 as a Single Conversion Single Condensation unit with a quenching unit 44 and a hydrogen peroxide tail gas scrubber 46 and process gas recycle.

| | | | | |
|---|---|---|---|---|
| Combustion | | | | (not shown) |
| Cooling | | | | (4) |
| Mixing process gas with recycle gas | | | | (6, 22, 40) |
| 1$^{st}$ Conversion and Cooling | | | | (8) |
| 1$^{st}$ Condensation and acid withdrawal | | | | (12, 36) |
| Withdrawal of recycle gas | | | | (42) |
| Process gas cooling (Quench) | | | | (44) |
| Process gas scrubbing | | | | (46) |

From Table 1 it can be seen that performance is good according to the specification and that it is possible to reduce the molar flow about 20% outside the recycle loop 42,22,40 again resulting in a more cost efficient unit than if constructed according to prior art.

TABLE 1

| | Example 1 no recirculation | Example 2 recirculation | Example 3 Single conversion, recirculation & scrubber | Unit |
|---|---|---|---|---|
| Feed Flow | 5731 | 5731 | 5731 | Nm3/h |
| Combustion Air | 85600 | 68600 (−20%) | 71000 (−17%) | Nm3/h |
| PG before recycle | 88400 | 71400 (−19%) | 74400 (−16%) | Nm3/h |
| PG inlet SO$_2$ converter | 88400 | 88600 (0%) | 92100 (+4%) | Nm3/h |
| Recycle | 0 | 17100 | 17700 | Nm3/h |
| Process gas after recycle | 74400 | 57400 (−23%) | 59400 (−20%) | Nm3/h |
| Clean Gas | 73500 | 56500 (−23%) | 61700 (−17%) | Nm3/h |
| Power production | 13.3 | 13.6 (+2.5%) | 13.7 (+3.0%) | MW |
| Sulphur in clean gas as SO$_2$ | 50 | 50 | 50 | kg/h |
| SO$_2$ removal | 99.83 | 99.83 | 99.83 | % |

The invention claimed is:

1. A process for oxidation of SO$_2$ to SO$_3$ comprising the steps of
   (a) directing a stream of feed gas comprising SO$_2$ and O$_2$, to a catalytically active material;
   (b) oxidizing an amount of said SO$_2$ in said process gas to SO$_3$ in the presence of at least 0.1% water and the catalytically active material, thereby providing a first oxidized process gas;
   (c) reacting SO$_3$ with water in a condensing column;
   (d) condensing H$_2$SO$_4$ in a condenser;
   (e) withdrawing a first desulphurized process gas and a first stream of sulphuric acid;
   (f) from the desulphurized process gas, withdrawing a recycle stream of desulphurized process gas, wherein the recycle stream is added to said stream of feed gas or said first oxidized process gas;
   (g) reheating the first desulphurized process gas;
   (h) oxidizing an amount of the remaining SO$_2$ in said first desulphurized process gas to SO$_3$ in the presence of a second catalytically active material, thereby providing a second oxidized process gas;
   (i) reacting SO$_3$ with water;
   (j) condensing H$_2$SO$_4$; and
   (k) withdrawing a second desulphurized process gas and a second stream of sulphuric acid.

2. A process according to claim 1 further comprising the process step of
   (l) heating the recycle stream of desulphurized process gas to a temperature at least 50° C. above the dew point of sulphuric acid in the recycle stream.

3. A process according to claim 1 further comprising one or more secondary sulphur removal process steps taken from the group consisting of:
   (m) removal of sulphuric acid mist by collection of droplets in a mist filter and withdrawal of collected sulphuric acid droplets;
   (n) removal of sulphuric acid mist by electrostatic precipitation, and removal of precipitated sulphuric acid;
   (o) removal of sulphur oxides by absorption in a scrubber, wherein said scrubber contains an alkaline solution and/or an oxidative solution.

4. A process according to claim 1, wherein the recycle stream is withdrawn downstream of the secondary sulphur removal process step.

5. A process according to claim 1, wherein the recycle stream is withdrawn upstream of the secondary sulphur removal process step.

6. A process according to claim 1, wherein the concentration of SO$_2$ in the feed gas is above 5% vol, and below 30% vol.

7. A process according to claim 1 in which at least 99% of the sulfur comprised in the feed gas is in oxidised form such as SO$_2$ or SO$_3$ or the corresponding acids.

8. A process according to claim 1 in which less than 50% of said desulphurized process gas is withdrawn as a recycle stream of desulphurized process gas.

9. A process according to claim 1 in which the volumetric concentration of oxygen in said process gas being directed to contact the catalytically active material is at least the same as the volumetric concentration of sulphur dioxide.

10. A process according to claim 1 in which the temperature of said recycled gas is above 200° C.

11. A process plant for desulphurisation of a feed gas said process plant comprising
   a first bed and a second bed of catalytically active material,
   a first condensation unit and a second condensation unit and a downstream desulphurisation plant, configured for recycling of a stream being withdrawn downstream said first condensation unit and optionally downstream the downstream desulphurisation unit, and being recycled to a process position upstream the first condensation unit, and optionally upstream said first bed of catalytically active material.

12. A process plant according to claim 11, in which said downstream desulphurization unit is taken from the group consisting of (i) a process unit comprising a catalytic material for oxidation of SO$_2$ to SO$_3$ and a condenser for condensation of sulphuric acid, (ii) a mist filter for removal of sulphuric acid mist by collection of droplets and withdrawal of collected sulphuric acid droplets, (iii) an electrostatic precipitator, for collection of liquid sulphuric acid from sulphuric acid mist, and (iv) a scrubber for removal of sulphur oxides by absorption in an alkaline solution and/or an oxidative solution.

13. A process plant for desulphurisation of a feed gas according to claim 11, configured for recycling of a stream being withdrawn downstream said first condensation unit, and upstream the downstream desulphurisation unit.

14. A process plant for production of sulphuric acid comprising a combustion unit for a sulphur rich material upstream a desulphurisation process plant according to claim 12, in which the stream being recycled is directed to a position upstream or downstream said combustion unit.

\* \* \* \* \*